US012583584B2

(12) United States Patent
Page et al.

(10) Patent No.: US 12,583,584 B2
(45) Date of Patent: Mar. 24, 2026

(54) TANKER AIRCRAFT FOR LONG-DISTANCE TRAVEL

(71) Applicant: JETZERO, INC., Long Beach, CA (US)

(72) Inventors: Mark Allan Page, Long Beach, CA (US); John Charles Vassberg, Long Beach, CA (US); Blaine Knight Rawdon, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/243,207

(22) Filed: Sep. 7, 2023

(65) Prior Publication Data

US 2025/0083811 A1     Mar. 13, 2025

(51) Int. Cl.
| | |
|---|---|
| *B64C 39/10* | (2006.01) |
| *B64D 37/04* | (2006.01) |
| *B64D 39/04* | (2006.01) |

(52) U.S. Cl.
CPC .............. B64C 39/10 (2013.01); B64D 37/04 (2013.01); *B64C 2039/105* (2013.01); *B64D 39/04* (2013.01)

(58) Field of Classification Search
CPC ... B64C 39/10; B64C 2039/105; B64D 37/04; B64D 39/04
See application file for complete search history.

(56) References Cited

U.S. PATENT DOCUMENTS

| | | | |
|---|---|---|---|
| 7,093,798 B2 | 8/2006 | Whelan | |
| 8,657,227 B1 * | 2/2014 | Bayliss | ................. B64D 13/00 244/58 |

| | | | |
|---|---|---|---|
| 11,247,776 B2 | 2/2022 | Princen | |
| 2005/0178912 A1 * | 8/2005 | Whelan | ..................... B64C 1/10 244/120 |
| 2006/0278761 A1 * | 12/2006 | Cutler | .................... B64D 39/00 244/135 A |
| 2010/0116931 A1 * | 5/2010 | Wilby | ..................... B64C 39/04 244/102 SS |
| 2010/0163670 A1 * | 7/2010 | Dizdarevic | ............ B64U 20/77 244/36 |
| 2012/0049004 A1 * | 3/2012 | Cutler | .................... B64D 39/06 244/135 A |

(Continued)

OTHER PUBLICATIONS

Larrimer, Beyond Tube-and-Wing, (book), NASA Aeronautics Book Series, Dec. 7, 2020.

(Continued)

*Primary Examiner* — Magdalena Topolski
*Assistant Examiner* — Shanna Danielle Glover
(74) *Attorney, Agent, or Firm* — Jeffrey Schox

(57) ABSTRACT

A tanker aircraft for long-distance travel, the tanker aircraft including a blended wing body having a main body, a transition, and wings with no clear demarcation between the wings and the main body along a leading edge of the tanker aircraft, a fuel storage located within the blended wing body, the fuel storage comprising a first fuel store, the first fuel store located within the transition and configured for long range flight and a second fuel store the second fuel store having a tanker capacity and a refueling boom system having a flying boom, the flying boom extending from the blended wing body, wherein the tanker aircraft is a long-range tanker aircraft.

16 Claims, 7 Drawing Sheets

(56)  References Cited

U.S. PATENT DOCUMENTS

| | | | | |
|---|---|---|---|---|
| 2014/0175215 | A1* | 6/2014 | Gallant | B64F 1/30 |
| | | | | 244/36 |
| 2015/0041591 | A1* | 2/2015 | Kutzmann | B64D 39/00 |
| | | | | 244/135 A |
| 2018/0009525 | A1* | 1/2018 | Keegan | B64U 50/32 |
| 2018/0346141 | A1* | 12/2018 | Hasmann | B64D 39/00 |
| 2019/0276135 | A1 | 9/2019 | Van | |
| 2020/0216175 | A1* | 7/2020 | de Melo | B64D 9/003 |
| 2023/0091929 | A1* | 3/2023 | Atreya | B64D 37/30 |
| | | | | 244/135 R |
| 2023/0324319 | A1* | 10/2023 | Bemment | F02C 7/22 |

OTHER PUBLICATIONS

X-48 Blended Wing Body (BWB), (webpage), https://www.globalsecurity.org/military/systems/aircraft/x-48.htm.

* cited by examiner

TANKER AIRCRAFT FOR LONG-DISTANCE TRAVEL

FIELD OF THE INVENTION

The present invention generally relates to the field of aircraft. In particular, the present invention is directed to a blended wing body tanker aircraft configured for long-distance travel.

BACKGROUND

Tube and wing tanker aircraft are limited in range due to inefficiencies in design and inefficiencies in fuel storage. In addition, tube and wing tanker aircraft must further burn large amounts of fuel per hour due to inefficiencies in design and increased weight.

SUMMARY OF THE DISCLOSURE

In an aspect, a tanker aircraft for long-distance travel is described. The tanker aircraft includes a blended wing body having a main body, a transition, and wings with no clear demarcation between the wings and the main body along a leading edge of the tanker aircraft. Tanker aircraft further includes a fuel storage located within the blended wing body, the fuel storage comprising a first fuel store, the first fuel store located within the transition and configured for long range flight and a second fuel store the second fuel store having a tanker capacity and a refueling boom system having a flying boom, the flying boom extending from the blended wing body, wherein the tanker aircraft is a long-range tanker aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
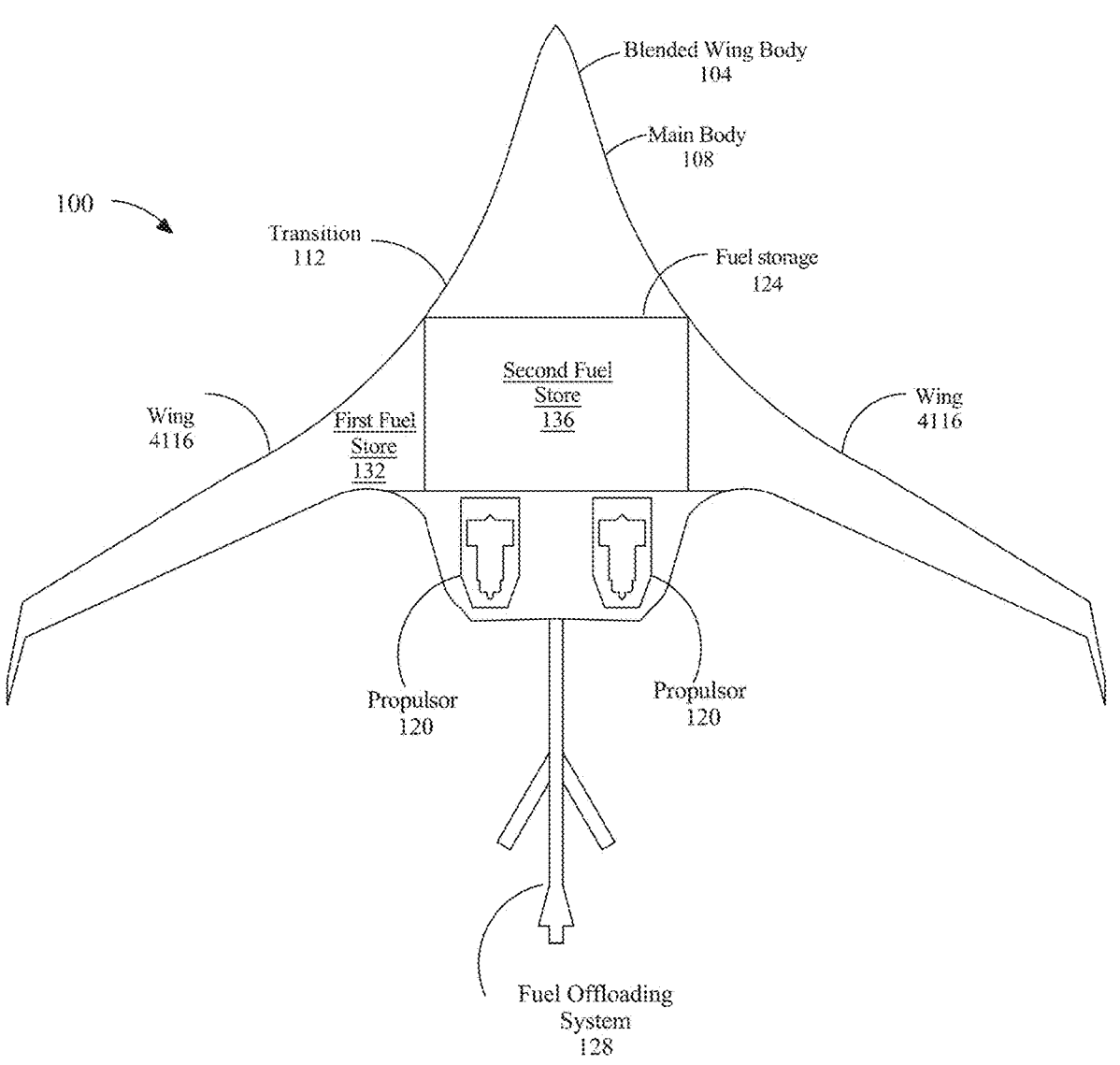
FIG. 1 is an illustration showing a schematic diagram of an exemplary embodiment of a tanker aircraft in accordance with one or more embodiments of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems of a tanker aircraft for long-distance travel. Tanker aircraft may include a fuel storage, wherein fuel storage is configured for long-range flight. Long range flight may include a flight distance of between 5,000 and 8,000 nautical miles. Tanker aircraft may include a first fuel store and a second fuel store wherein the first fuel store and the second fuel store contain fuels having differing material properties.

Aspects of the present disclosure can be used to provide fuel for other aircraft in foreign countries or in similar areas far away from an accessible fueling station. Aspects of the present disclosure can also be used to minimize flight time by reducing the amount of stops necessary to refuel tanker. This is so, due to the long-range capabilities of tanker aircraft and the design of tanker aircraft.

Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 3. Furthermore, there is no intention to be bound by any expressed or implied theory presented in this disclosure.

Aircraft range increases with greater fuel fraction. Tube and wing aircraft are limited to a fuel fraction approximately proportional to the three-halves power of the tube and wing aircraft's maximum takeoff gross weight. As a result, larger, heavier aircraft are capable of travelling long distances while smaller, lighter aircraft are restricted to shorter routes. Commercial tube and wing jet transports cannot efficiently transport a smaller capacity of passengers over a long range.

"Fuel fraction," as described herein, is a parameter determined by dividing the weight of fuel on an aircraft by the gross take-off weight of the aircraft. In some embodiments, fuel fraction may be used to determine the maximum range an aircraft can travel without refueling. Fuel fraction may be calculated as the fuel weight of an aircraft at takeoff divided by an airplane maximum takeoff gross weight (MTOGW). MTOGW may be defined as the sum of three weight components: the payload of an aircraft, the fuel of the aircraft and the operating empty weight of the aircraft. Fuel fraction may increase as fuel weight increases. In addition, operating empty weight and MTOGW of an aircraft may be constant throughout a plurality of different sized aircraft. This causes fuel weight and payload weight to be directly proportional. As a result, as fuel weight increases, thereby increasing fuel fraction, payload weight may decrease.

With respect to tube and wing aircraft, fuel weight of an aircraft at takeoff is proportional to a wing area of an aircraft to the power of 3/2. This is due to the square cube law in which the wing area is proportional to the wingspan squared, and the wing volume is proportional to the wingspan cubed, wherein fuel is stored within a portion of wing volume. In a tube and wing aircraft, fuel volume may only be increased only if wing volume and wing length are increased.

In addition, in tube and wing aircraft, wing area is proportional to MTOGW. Wing loading on a tube and wing aircraft may be constant due to regulatory constraints. Wing loading is defined as the MTOGW divided by an aircraft wing area. Larger wing loading on a tube and wing aircraft requires a larger field length for takeoff and landing. As a result, in order to ensure that larger field length is not required for takeoff and landing, an increase in MTOGW may cause an increase in wing area.

Since wing area is proportional to MTOGW on a tube and wing and fuel weight is proportional to wing area to the power of 3/2 on a tube and wing, an increase in fuel weight must increase the MTOGW. As a result, a lighter tube and wing aircraft must have a smaller fuel fraction and therefore travel shorter distances while a heavier tube and wing aircraft may contain a larger fuel fraction and can therefore travel larger distances. Due to the relationship between fuel weight and MTOGW, a tube and wing aircraft having a larger fuel fraction may be larger and carry more passengers to be feasible while tube and wing aircraft having a lower fuel fraction may be smaller and carry less passengers in order to save on fuel costs.

Referring now to FIG. 1, a schematic diagram of an exemplary embodiment of a tanker aircraft 100 for long distance travel is illustrated. Tanker aircraft 100 includes a blended wing body. As used in this disclosure, A "blended wing body" (also referred to as a "BWB", a "blended body", or a "hybrid wing body" (HWB) in this disclosure), is a fixed-wing aircraft body having no striking demarcation between wings 116 and a main body 108 of the aircraft along a leading edge of the aircraft. Blended wing body includes a main body 108, a transition 112, and wings 116 with no clear demarcation between wings 116 and main body 108 along a leading edge of tanker aircraft 100. As used in this disclosure, a "tanker" or "tanker aircraft" is an aircraft configured to store, transport, and/or offload fuel. In some cases, tanker aircraft 100 may be used to offload fuel to another aircraft, for example in flight, thereby increasing flight time and/or range of the other aircraft. Additional disclosure related to tanker aircraft may be found in U.S. patent application Ser. No. 17/672,829 titled "BLENDED WING BODY TANKER AND METHOD OF USE," filed on Feb. 16, 2022, the entirety of which is incorporated herein by reference.

With continued reference to FIG. 1, BWB 104 may include two wings 116. As used in this disclosure, "wings" are components of an aircraft configured to generate lift as a function of dynamic pressure and angle of attack. Each wing may be located on an opposing sides of tanker aircraft 100 such that, for example, a most distal part of each wing may represent a most distal part of tanker aircraft 100. In one or more embodiments, aircraft 100 and/or blended wing body may include two transitions 112. As used in this disclosure, a "transition" of a blended wing body is a portion of a blended wing body between wing and main body 108.

With continued reference to FIG. 1, tanker aircraft 100 includes at least a propulsor 120, propulsor 120 attached to a portion of main body 108 and configured to propel tanker aircraft 100 through air. As used in this disclosure, a "propulsor" is a system or device configured to generate thrust in a fluid medium. For example, propulsor 120 may include a fan, propellor, rotor, and the like. In some cases, a propulsor 120 may include one or more components of an engine (e.g., jet engine) and a motor (e.g., electric motor). Propulsor 120 may include any propulsion system, propulsor 120, engine, or motor described in this disclosure. In one or more embodiments, propulsor 120 may include an engine fueled by more than one fuel. Alternatively or additionally, in some embodiments, propulsor 120 may include a motor powered by electricity. In some cases. electricity may be derived from a fuel storage as described in this disclosure. For example, in some cases, electricity may be generated from one or more of a generator, alternator or the like. Alternatively or additionally, in some cases, electricity may be produced by a fuel cell. In some embodiments, propulsor 120 may include an electric motor. Electric motor may be powered by one or more electricity sources, such as without limitation batteries and/or fuel cells. Additional disclosure related to fuel cell technology may be found in U.S. patent application Ser. No. 17/478,724 title "BLENDED WING BODY AIR-CRAFT WITH A FUEL CELL AND METHOD OF USE," filed on Sep. 17, 2021, and incorporated by reference, in its entirety, within this disclosure. In some cases, a fuel cell may provide steady state power to propulsor 120, such as for example, for cruise flight. Alternatively or additionally, a battery or another electricity source may provide supplemental power for climbing. In some cases, fuel cell may be configured to charge battery or another electricity source, when it produces excess power, for example during descent or ground operations. In one or more embodiments, propulsor 120 may include at least a propulsor 120 mechanically affixed to tanker aircraft 100. In some cases, at least a propulsor 120 may be configured to propel tanker aircraft 100. In some embodiments, at least a propulsor 120 may include at least an electric motor operatively connected with fuel cell. Alternatively or additionally, propulsor 120 may be powered by one or more batteries. Batteries may include any batteries described in this disclosure. Propulsor 120 may be operatively connected to fuel cell by way of electrical communication, for example through one or more conductors. In some cases, at least a fuel cell may be configured to power at least an electric motor of propulsor 120. In some embodiments, at least a propulsor 120 may include both a combustion engine and an electric motor. In some embodiments, at least a propulsor 120 may be attached to an upper aft surface of main body 108.

With continued reference to FIG. 1, tanker aircraft 100 includes a fuel storage 124 located within blended wing body 104. As described in this disclosure, "fuel storage" is an aircraft component configured to store a fuel. In some cases, fuel storage 124 may include a fuel store. "Fuel store" as defined herein refers to an enclosed compartment used to store fuel. In some embodiments, fuel storage 124 may include a plurality of fuel stores. In some cases, fuel storage 124 may include a plurality of fuel stores, wherein each of the fuel store contains the same or substantially different fuel. Fuel may include a liquid fuel, a gaseous fluid, a solid fuel, fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. Fuel storage 124 is located substantially within blended wing body 104 of tanker aircraft 100. For example, and without limitation, within a wing portion of blended wing body 104. Aviation fuels may include petroleum-based fuels, or petroleum and synthetic fuel blends, used to power tanker aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for tanker aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite. In some cases, fuel storage 124 may be located on a lower portion of main body 108.

With continued reference to FIG. 1, fuel storage 124 may include an insulated wall. As used in this disclosure in a thermal context, an "insulated wall" is any structure configured to restrict, slow, minimize, or otherwise limit a flow of heat. In some cases, an insulated wall may include a hermetically sealed portion, through which heat transfer by convection is limited. For example, in some cases an insulated wall may include a hermetically sealed portion containing one or more of a vacuum and gas having a low heat transfer properties (e.g., argon, krypton, and the like). As used in this disclosure, a "vacuum" is a pressure below that of the cabin pressure. Alternatively, or additionally, in some cases, insulated wall may include insulation. As used in this disclosure in a thermal context, "insulation" is any material that restricts, slows, minimizes, or otherwise limits a flow of heat. Insulated wall and insulation may include any thermal insulation means described in this disclosure. Additional disclosure related to a fuel storage 124 may be found in U.S. patent application Ser. No. 17/672,829 title "BLENDED WING BODY AIRCRAFT WITH A FUEL CELL AND METHOD OF USE," filed on Feb. 16, 2022, and incorporated by reference, in its entirety, within this disclosure.

| | |
|---|---|
| Radius (nmi) @ 50,000 lb offload, 2 hr Orbit | 5,750 |
| Offload (lb) @ 2,500 nmi, 2 hr Orbit | 121,000 |
| MTOGW (lb) | 316,666 |
| Ceiling (ft) | 45,000 |
| Takeoff Field Length (ft) | 8,340 |
| Landing Field Length (ft) | 4,400 |
| FB/Ton-nmi | 0.291 |
| SLST (lb) | 34,000 |
| 463L Pallets | 20 |
| Total length (ft) | 114 |
| Ground span (ft) | 116 |

With continued reference to FIG. 1, fuel storage 124 includes a fuel capacity. "Fuel capacity" as described in this disclosure refers to a quantity of fuel that can be stored in fuel storage 124. Fuel capacity may be represented as an overall fuel capacity wherein the overall fuel capacity is quantified in liters, pounds, kilograms, gallons or the like. Fuel capacity may further be represented as a range of distance wherein the fuel capacity is representative of the distance tanker aircraft 100 or another aircraft can travel. For example, fuel capacity may include an 8,000 nautical mile capacity wherein the quantity of fuel within fuel storage 124 can power tanker aircraft 100 up to 8,0000 nautical miles. For example, fuel capacity may include an 5,000-9,000 nautical mile capacity wherein the quantity of fuel within fuel storage 124 can power tanker aircraft 100 up to 5,000-9,0000 nautical miles. For example, fuel capacity may include an 7,000-8,000 nautical mile capacity wherein the quantity of fuel within fuel storage 124 can power tanker aircraft 100 up to 7,000-8,0000 nautical miles. Fuel capacity may further be quantified in time, wherein the fuel capacity represents the amount of time tanker aircraft 100 can travel. For example, fuel capacity may include a capacity of 8 hours wherein tanker aircraft 100 can travel for a maximum of 8 hours. For example, fuel capacity may include a capacity of 4-8 hours wherein tanker aircraft 100 can travel for a maximum of 4-8 hours. For example, fuel capacity may include a capacity of 6-7 hours wherein tanker aircraft 100 can travel for a maximum of 6-7 hours. In some embodiments, fuel capacity may include a maximum capacity of 20,000-50,000 gallons of fuel. In some embodiments, fuel capacity may include a maximum capacity of 30,000-40,000 gallons of fuel. In some embodiments, fuel capacity may include a maximum capacity of 35,000-40,000 gallons of fuel. In some cases, fuel storage 124 may contain a maximum capacity of 20,000 gallons of fuel. In some cases, fuel storage 124 contains a maximum capacity of 30,000 gallons of fuel. In some cases, fuel storage 124 contains a maximum capacity of 40,000 gallons of fuel.

With continued reference to FIG. 1, in some embodiments, tanker aircraft 100 may include a radius at 50,000 lb offload (2 hr orbit) of 4,000-7,000 nmi. In some embodiments, tanker aircraft 100 may include a radius at 50,000 lb offload (2 hr orbit) of 5,500-6,000 nmi. For the purposes of this disclosure, a "long-range tanker aircraft" is a tanker aircraft that is capable of exceeding a radius of 3,500 nmi at 50,000 lb offload. In some embodiments, a long-range tanker aircraft may have a 4,500 nmi radius at 50,000 lb offload. In some embodiments, tanker aircraft 100 may include an offload capacity at 2,500 nmi (2 hr orbit) of 90,000 to 140,000 lb. In some embodiments, tanker aircraft 100 may include an offload capacity at 2,500 nmi (2 hr orbit) of 100,000 to 130,000 lb. In some embodiments, tanker aircraft 100 may include an offload capacity at 2,500 nmi (2 hr orbit) of 115,000 to 125,000 lb. In some embodiments, tanker aircraft 100 may include MTOGW of 250,000 to 350,000 lbs. In some embodiments, tanker aircraft 100 may include MTOGW of 275,000 to 325,000 lbs. In some embodiments, tanker aircraft 100 may include MTOGW of 300,000 to 325,000 lbs. In some embodiments, tanker aircraft 100 may include a flight ceiling of 35,000 to 55,000 ft. In some embodiments, tanker aircraft 100 may include a flight ceiling of 40,000 to 50,000 ft. In some embodiments, tanker aircraft 100 may include a flight ceiling of 44,000 to 47,000 ft. In some embodiments, tanker aircraft 100 may include a takeoff field length of 8,000 to 9,000 ft. In some embodiments, tanker aircraft 100 may include a takeoff field length of 7,000 to 10,000 ft. In some embodiments, tanker aircraft 100 may include a takeoff field length of 8,000 to 8,500 ft. In some embodiments, tanker aircraft 100 may include a landing field length of 4,000 to 6,000 ft. In some embodiments, tanker aircraft 100 may include a landing field length of 4,000 to 5,000 ft. In some embodiments, tanker aircraft 100 may include a landing field length of 4,000 to 4,500 ft. In some embodiments, tanker aircraft 100 may include an FB/Ton-nmi (Fuel burn per ton nautical mile) of 0.200 to 0.500. In some embodiments, tanker aircraft 100 may include an FB/Ton-nmi of 0.200 to 0.300. In some embodiments, tanker aircraft may include an SLST of 30,000 to 45,000 lb. In some embodiments, tanker aircraft may include an SLST of 32,000 to 40,000 lb. In some embodiments, tanker aircraft may include an SLST of 32,000 to 45,000 lb. In some embodiments, tanker aircraft 100 may include a capacity to hold 18-22 463L pallets. In some embodiments, tanker aircraft 100 may include a capacity to hold 19-21 463L pallets. In some embodiments, tanker aircraft 100 may include a total length of 100 to 150 ft. In some embodiments, tanker aircraft 100 may include a total length of 110 to 130 ft. In some embodiments, tanker aircraft 100 may include a total length of 110 to 120 ft. In some embodiments, tanker aircraft 100 may include a ground span of 100 to 130 ft. In some embodiments, tanker aircraft 100 may include a ground span of 110 to 120 ft.

| Fuel Offload (lb) | Radius (nmi) |
| --- | --- |
| 180k | 0k |
| 165k | 1k |
| 145k | 2k |
| 123k | 3k |
| 103k | 4k |
| 81k | 5k |
| 60k | 6k |
| 37k | 7k |
| 15k | 8k |
| 5k | 8.5k |

With continued reference to FIG. 1, as a non-limiting example, at a radius of 1 k nmi, fuel offload may be between 160 and 170 k lb. As a non-limiting example, at a radius of 2 k nmi, fuel offload may be between 140 and 150 k lb. As a non-limiting example, at a radius of 3 k nmi, fuel offload may be between 118 and 128 k lb. As a non-limiting example, at a radius of 4 k nmi, fuel offload may be between 98 and 108 k lb. As a non-limiting example, at a radius of 5 k nmi, fuel offload may be between 76 and 86 k lb. As a non-limiting example, at a radius of 6 k nmi, fuel offload may be between 55 and 65 k lb. As a non-limiting example, at a radius of 7 k nmi, fuel offload may be between 32 and 42 k lb. As a non-limiting example, at a radius of 8 k nmi, fuel offload may be 10 to 20 k lb.

With continued reference to FIG. 1, fuel storage 124 includes a first fuel store 132. First fuel store 132 is located within transition 112 of BWB 104. In some embodiments, transition 112 may increase in chord and thickness from wings 116 in a direction of main body 108. First fuel store 132 may be located within transition 112 wherein first fuel store 132 is located within a cavity located in the increased chord and thickness. In some embodiments, first fuel store 132 may be located within in a portion of transition 112 and/or a portion of wings 116. In some embodiments first fuel store 132 may be larger than a fuel storage of a tube and wing tanker aircraft due to the increased chord and thickness of transition 112. First fuel store 132 may further be located within more than one transition 112 and wing of blended wing body 104. First fuel store 132 may include a first fuel wherein first fuel contains any type of fuel as described in this disclosure. First fuel store 132 is configured for long-range flight as described below. Additionally or alternatively, first fuel store 132 may be configured for long-range flight such that first fuel store 132 contains enough fuel to transport tanker aircraft 100 over a distance of between 5000 and 8000 nautical miles. In some cases, first fuel store 132 contains enough fuel such that tanker aircraft 100 can travel over 9000 nautical miles. In some embodiments, propulsor 120 is configured to receive first fuel from first fuel store 132. First fuel may contain any fuel suitable to propel tanker aircraft 100.

With continued reference to FIG. 1, first fuel store 132 is configured for long-range flight. "Long-range flight" as described in this disclosure is the ability to travel distances of at least 5,000 nm, without the need to stop and refuel. Long range flight may be suitable for instances in which an aircraft seeks to travel a long distance without having to stop over to refuel. For example, a military aircraft traveling over a foreign country may seek to travel over the country without having to stop and refuel. Long-range flights may decrease a flight duration due to the aircraft's capability to travel long distances without having to stop. In some embodiments, long-range flight may refer to an aircraft capable of traveling between two countries. Long range flight may include a maximum flight distance of between 5000 and 8000 nautical miles. In some embodiments, long-range flight may include a maximum flight distance of 9000 nautical miles. In some embodiments, long-range flight may include a maximum flight distance of 9,000 to 12,400 nautical miles. In some cases, first fuel store 132 contains a maximum flight distance of 9000 nautical miles. Additionally, or alternatively first fuel store 132 contains a maximum flight distance of 12,400 miles. In some embodiments, long range flight may include a minimum flight duration of 8 hours. First fuel store 132 may be configured for long-range flight such that first fuel store 132 contains enough fuel for an aircraft to travel a maximum distance of 8,0000 miles. Additionally, or alternatively, first fuel store 132 may be configured for long-range flight such that tanker aircraft 100 can travel at least 8 hours without having to stop and refuel. In some embodiments, long range flight may include a minimum flight duration of 12 hours. In some embodiments, tanker aircraft 100 configured for long range flight includes tanker aircraft 100 having an auxiliary power unit. "Auxiliary power unit (APU)" as described herein refers to an electrical generating device that provides energy to an aircraft without the use of an aircraft engine. APU may include a small turbine engine in which the APU generates energy through the combustion of air and fuel. APU may power various sections of tanker aircraft 100 such as air conditioning, lighting and the like. APU may be used to provide electrical power when power cannot be generated through an engine of tanker aircraft 100. APU may further be utilized to start an engine of tanker aircraft 100. In some embodiments, APU may be used when an aircraft is not in motion. APU may reduce fuel consumption by powering various components of tanker aircraft 100 in place of an engine powering the components. APU may be located on a rear surface of tanker aircraft 100. In some embodiments, APU may be located in a nacelle of tanker aircraft 100.

With continued reference to FIG. 1, fuel storage 124 includes a second fuel store 136. Second fuel store 136 may be located anywhere within blended wing body 104. For example, second fuel store 136 may be located within main body 108. In some cases, second fuel store 136 is located within main body 108. In some cases, second fuel store 136 may be larger than first fuel store 132. In some cases, at least a propulsor 120 is configured to receive fuel from the first fuel store 132 and the second fuel store 136. In some embodiments, second fuel store 136 may be configured as a fuel storage 124 tank for another aircraft. In some cases, second fuel store 136 contains a second fuel substantially similar to first fuel. In some cases, first fuel and second fuel have differing material properties or differing fuel types. For example, first fuel store 132 may contain a fuel cell whereas second fuel store 136 may contain kerosene. In another non-limiting example, first fuel store 132 may contain a liquid hydrogen fuel whereas second fuel store 136 contains a gasoline-based fuel. In some cases, second fuel store 136 may be removably attached to main body 108. Additionally, or alternatively, second fuel store 136 may be removably attached such that second fuel store 136 may be removed from main body 108 and replaced with a cargo store or the like. In some cases, second fuel store 136 is fixedly attached to main body 108. In some cases, second fuel store 136 contains a fuel capacity sufficient for long-range flight. In some cases, second fuel store 136 may include an outlet, wherein the outlet is configured to release fuel.

With continued reference to FIG. 1, Second fuel store 136 contains a tanker capacity. "Tanker capacity" as described herein refers to a fuel store capacity of at least 100,000 pounds of fuel. In some embodiments, tanker capacity may include a fuel store capacity of 100,000 to 1,000,000 pounds of fuel. In some embodiments, tanker capacity may include a fuel store capacity of 300,000 to 800,000 pounds of fuel. In some embodiments, tanker capacity may include a fuel store capacity of 400,000 to 750,000 pounds of fuel. In some embodiments tanker capacity contains a fuel store capacity of at least 200,000 pounds of fuel. In some embodiments, tanker capacity contains a maximum capacity of 1,000,000 pounds of fuel. In some cases, second fuel store 136 may be fluidly connected to a refueling system as described below.

With continued reference to FIG. 1, in some embodiments, main body 108 may include an interior cavity having a single deck, wherein a cargo store and fuel storage 124 are located on or above the single deck. In some cases, at least a portion of the cargo store and/or at least a portion of the fuel storage 124 are located above the single deck. As used in this disclosure, a "deck" on an aircraft is a platform upon which cargo and fuel may be stored. A single deck may be contrasted with a two-deck configuration analogously to a single-story building contrasted to a two-story building. Single deck may include a deck with various heights differentials. For example, single deck may include a step wherein a portion main body 108 is slightly elevated in comparison to another portion of main body 108. A "cargo store" is a location in which cargo can be held. For example, cargo store may include the baggage of passengers on the aircraft. Cargo store may further include equipment necessary for a flight or for the destination of a flight. In some cases cargo capacity may have a capacity of at least 14 M1 container and 16 additional LD-3 containers.

With continued reference to FIG. 1, tanker aircraft 100 includes a fuel offloading system 128. In some embodiments, fuel offloading system 128 may include a refueling boom system extending from blended wing body 104. "Refueling boom system" is a fuel offloading system configured to offload fuel from a tanker and onload fuel onto another aircraft through a boom. In some cases, fuel offloading system 128 may be configured for aerial refueling wherein taker aircraft refuels another aircraft during a flight. fuel offloading system 128 may be operatively connected to fuel storage 124 and configured to offload fuel. In some cases, fuel offloading system 128 may be operatively connected to first fuel store 132 and configured to offload first fuel. Additionally, or alternatively, fuel offloading system 128 may be operatively connected to second fuel store 136 wherein refueling boom system is configured to offload second fuel. In some cases, fuel offloading system 128 may be fluidly connected to second fuel store 136. "Fluidly connected" as defined herein is a linking between two components that allows a fluid to pass through from one component to another. fuel offloading system 128 may be fluidly connected such that second fuel store 136 supplies liquid fuel to fuel offloading system 128. In some cases, first fuel store 132 may be fluidly connected to fuel offloading system 128. In some cases, first fuel store 132 and second fuel store 136 may be separate and distinct fuel storages having differing fuels wherein one of the two fuel stores may be fluidly connected to fuel offloading system 128. In some cases, first fuel store 132 may be fluidly connected to second fuel store 136. In some cases first fuel store 132 and second fuel store 136 may include a valve, wherein the valve is configured to prevent flow or mixing of a fuel within the first fuel store 132 and a fuel in the second fuel store 136. In some cases, the valve may prevent mixing of two differing fuels such as jet fuel and hydrogen fuel. In some cases, the valve may allow for fuel from first fuel store and fuel from second fuel store to mix when mixing may be beneficial, such as when the fuel in the first fuel store 132 and the fuel in the second fuel store 136 are similar and/or may be mixed. "Valve" for the purposes of this disclosure is a device configured to control the passage of a fluid or a gaseous substance. In some cases, valve may be configured to control the passage of a fuel within a fuel store such as first fuel store 132. In some cases, a valve may be configured to prevent mixing between two fluidly connected fuel stores. In some cases, valve may include a ball valve, a plug valve, a butterfly valve, a pinch valve, a needle valve, and the like. In some cases, valve may include an electric valve or an electromechanical valve wherein a motor and/or an actuator may control the valve. In some cases, the electric valve may be controlled through a series of commands by a computing device such as any computing device described herein. In some cases, the electric valve may be configured to remotely open and close a valve connected two fuel stores. In some cases, first fuel store 132 is not fluidly connected to second fuel store 136. Additionally or alternatively first fuel store 132 may contain a differing fuel from second fuel store 136 wherein first fuel store 132 may not be fluidly connected to second fuel store 136. In some embodiments, refueling boom system may further include a flying boom. "Flying boom" as described herein is a tube in which fuel is transported through in order to fuel another aircraft. Flying boom may include a telescopic boom. A telescopic boom is a tube made of concentric tubular parts that can slide into itself such that the telescopic boom may shorten or expand in length. Telescopic boom may be stored within main body 108. Additionally, or alternatively telescopic boom may expand out of main body 108 such that telescopic boom may fuel another aircraft. In some embodiments, flying boom extends from fuel store. Additionally, or alternatively. flying boom is operatively connected to second fuel store 136 and is configured to transmit fuel from second fuel store 136 to another aircraft. In some embodiments, fuel offloading system 128 may be removably attached to blended wing body 104. Additionally, or alternatively refueling boom system may be removable attached such that flying boom may be removed when tanker aircraft 100 is not being utilized for refueling. In some embodiments, fuel offloading system 128 may include a fuel sensor, wherein fuel sensor is configured to detect a fuel quantity. Fuel sensor is described in greater detail below in FIGS. 2A-2B. In some embodiments, fuel offloading system 128 may include a video capture device, the video capture device configured to capture a surrounding area of the tanker aircraft 100. Video capture device is described in further detail below in FIGS. 2A-2B. In some embodiments fuel offloading system 128 includes a lighting system wherein the lighting system includes at least one light source. The at least one light source may emit light such that another tanker aircraft may position itself correctly to receive fuel. In some embodiments, fuel offloading system 128 includes an electric actuator, wherein the electric actuator is configured to control the flying boom. Electric actuator may be described in further detail below. Additional disclosure on refueling boom systems and fuel stores may further be found in U.S. patent application Ser. No. 18/101, 836, filed on Jan. 26, 2023, and titled "BLENDED WING BODY AIRCRAFT WITH A PASSENGER COMPART-MENT," the entirety of which is incorporated by reference. Refueling boom system is described in further detail below in FIG. 2.

With continued reference to FIG. 1, tanker aircraft is a long-range aircraft. "Long range aircraft" is an aircraft capable of long-range flight as described above. Long range aircraft may include a maximum flight distance of between 5000 and 8000 nm. In some embodiments, long range aircraft may include a maximum flight distance of 9000 nm. In some embodiments, long-range aircraft may include tanker aircraft 100 having an aspect ratio of at least 8. "Aspect ratio" as described herein refers to a ratio of a wing length over an average wing chord. Aspect ratio may be calculated as the length of a wingspan squared over a wing area $$\left(\frac{\text{Wingspan}^2}{\text{Wing Area}}\right).$$

The aspect ratio of a commercial tube and wing aircraft may range from 7 to 9. A higher aspect ratio for an aircraft indicates that an aircraft has larger wings whereas a lower aspect ratio indicates that an aircraft has smaller wings. An aircraft with a higher aspect ratio generally gives an aircraft increased lift and decreased induced drag, thereby increasing fuel efficiency. In addition, an aircraft with a higher aspect ratio has more stability as the larger wings help balance the body of the aircraft. For example, a tube and wing tanker aircraft such a McDonnell Douglas KC-10 contains an aspect ratio of 6.8 wherein the wingspan is 50.41 meters, and a wing area is 367.7 square meters. The KC-10 uses about 18,099 liters of fuel per hour. In contrast, a Boeing 747 super tanker having a wingspan of 211 meters and wing area of 5650 square meters contains an aspect ratio of about 7.8 uses about 1500 liters of fuel per hour. In addition, the Boeing 747 supertanker contains a maximum takeoff weight almost double that of the KC-10. An aircraft with a higher aspect ratio may be preferred for long range flight where fuel efficiency of the aircraft may be important. As opposed to tube and wing tanker aircraft that contain a maximum flight distance of 5,000 nm, tanker aircraft is a long-range aircraft. As a result, an increased aspect ratio will increase fuel efficiency of tanker aircraft. In addition, an aircraft with a higher aspect ratio may be preferred for long range where increased stability may be favored over increased maneuverability. As opposed to short haul flights wherein a lower aspect ratio may be preferred for easier takeoff and landing, long range aircraft may include a higher aspect ratio such that long-range aircraft is configured for long-range flight. In some embodiments, tanker aircraft 100 may contain an increased wing length wherein tanker aircraft 100 contains an aspect ratio of at least 9. In some embodiments, tanker aircraft 100 may include an increased wing length wherein commercial aircraft contains an aspect ratio of at least 10. In some embodiments long-range aircraft may include a higher cruising speed as opposed to a short-range tanker aircraft. In some embodiments, long-range aircraft may further include an aircraft flying a long-range altitude. Long range altitude may include an altitude of at least 36,000 feet. In some embodiment tanker aircraft may perform aerial refueling at an altitude of at least 36,000 feet. As opposed to tube and wing tanker aircraft that may refuel between 15,000 and 25,000 feet, long range aircraft may refuel at higher altitudes.

With continued reference to FIG. 1, tanker aircraft 100 is a long-range aircraft wherein tanker aircraft 100 contains a maximum payload weight of 120,000 lbs. and has a maximum range of 4,780 nautical miles. Additionally or alternatively tanker aircraft 100 may contain a maximum takeoff gross weight of 320,000 lbs. Additionally or alternatively tanker aircraft 100 may contain a maximum takeoff gross weight of between 200,000 lbs and 400,000 lbs. Additionally or alliteratively, tanker aircraft 100 may be configured for long-range flight wherein tanker aircraft has a maximum fuel burn of 0.270 lbs per ton-nautical mile. In some embodiments, long range-aircraft and/or second fuel store 136 may contain a maximum fuel capacity of 50,000 lbs and tanker aircraft 100 contains a maximum flight radius of 5,750 nautical miles. As described herein "flight radius" refers to the maximum distance an aircraft may travel before traveling back to its original location prior to landing. For example, an aircraft having a maximum flight radius of 2,500 nautical miles may travel 2,500 to a particular destination and 2,500 nautical miles back to its original location, totaling a distance of 5,000 nautical miles. Additionally, or alternatively, fuel store 136 may contain a maximum fuel capacity of 121,000 lbs wherein tanker aircraft contains a maximum flight radius of 2,500 nautical miles. In some embodiments, tanker aircraft is a long-range aircraft wherein second fuel store 136 contains a maximum fuel capacity of 22,750 lbs. and a maximum flight radius of 7,000 nautical miles.

With continued reference to claim 1, a portion of aircraft skin may include a carbon fiber material. Portion may include any section or segment of aircraft skin. Portion may further include an entirety of aircraft skin. In some embodiments, carbon fiber material may include a stitched resin infused carbon fiber cloth. "Stitched resin infused carbon cloth" as described herein is a fibrous material, such as carbon, that is stitched together and embedded within a resin. Stitched resin infused carbon cloth may include a composite laminate wherein the composite laminate is held together and reinforced with stitching. Stitched resin infused carbon fiber cloth may include a plurality of carbon fiber material layers, wherein the plurality of carbon fiber material layers may be stitched together prior to molding. Stitched resin infused carbon fiber cloth may further include a composite having a single layer. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. Stitched resin infused carbon cloth may include stitching wherein the stitching binds the one or more composite lamina of the composite laminate. Carbon fiber material may be stitched using a modified lock stitch, a lock stitch, a chain stitch or the like. In some embodiments, carbon fiber material may be stitched using material such as polyester, aramid or a thermoplastic. Stitched infused carbon fiber cloth may further include a plurality of layers, wherein each layer is a composite of carbon fibers and resin. In some embodiments, stitching provides delamination resistance and improves damage tolerance of a composite laminate. Stitched resin infused carbon fiber cloth may be formed using a resin transfer molding process. Resin Transfer Molding as described is a closed molding process wherein resin is injected into a mold having a dry composite, such as carbon fibers, and clamped together. Continuing, a vacuum is then applied to the mold to remove any air and ensure that the dry composite has been properly infused. The carbon fiber material may be placed into a vacuum bag wherein air is sucked out of the vacuum bag and resin is drawn into the vacuum bag. The drawn resin infused the carbon fiber cloth and creates the molded part.

Additional disclosure on carbon fiber material and stitched resin infused carbon fiber cloths may further be found in U.S. patent application Ser. No. 18/117,145, filed on Mar. 3, 2023, and titled "AIRCRAFT WITH CARBON FIBER MATERIAL AND A METHOD OF MANUFAC-TURE," the entirety of which is incorporated by reference herein. In some embodiments aircraft skin may contain a skin thickness of at least 0.5 mm. in some embodiments, a portion of aircraft skin may contain a skin thickness of at least 2.00 mm wherein tanker aircraft 100 is configured for long range flight. A higher skin thickness may be beneficial for long range flight wherein the higher skin thickness may support an aircraft having more weight or increase structural requirements. In some embodiments, aircraft skin may contain a skin thickness of at least 3.00 mm or more.

With continued reference to FIG. 1, tanker aircraft 100 may include a landing gear system, the landing gear system having a nose gear disposed proximate a front of the aircraft, the nose gear controllably movable between a first position in which the nose gear is retracted, and a second position in which the nose gear is extended. "Retracted" for the purposes of this disclosure refers to a positioning of one or more components of the landing gear system, wherein the components are not extended to their maximum capable length. In a non-limiting example, a component may be retracted wherein the component may extend outside of the outer mold line but only a portion of its maximum capable length. Continuing, the component may be retracted when the component only extended half of its capable length. In a first position, nose gear may be retracted or stowed away within blended wing body 104 and/or main body. Nose gear may include a hinge, a swingarm, or any folding mechanism that may fold nose gear to store away into BWB 104 and/or main body 108. In second position, nose gear may extend at or past a ground surface. "Extended" for the purposes of this disclosure is a positioning of one or more landing gear components outside of the outer mold line wherein the components extend at least a portion of their maximum length. For example, a landing gear system may be extended wherein a component may extend a portion or the entirety of the maximum capable length. Landing gear system may further include a main gear disposed proximate a rear of the aircraft, the main gear controllably movable between a third position, in which the main gear is extended, and a fourth position, in which the main gear is retracted, wherein, in a ground position, the nose gear is in the first position and main gear is in the third position and a fuselage of the aircraft is substantially level with the ground. In a third position, main gear may be extended at the same length as nose gear. In some embodiments, third position includes a position wherein main gear is extended at or below ground surface relative to nose gear. In a fourth position main gear may be retracted wherein main gear is not fully extended. This may include main gear being partially extended wherein main gear is at or below ground surface. In an angle-of-attack (AOA) position, the nose gear is in the second position and the main gear is in the fourth position and the fuselage of the aircraft is rotated to a positive AOA with respect to the ground. In some embodiments, tanker aircraft 100 may contain landing gear system configured to shorten required takeoff field length and/or landing field length. In some cases, tanker aircraft ma a required takeoff field length of 8,340 ft and a required landing field length of 4,400 ft. In some embodiments, a required takeoff field length may be 8,340 ft or less. In some embodiments, required landing field length may be 4,400 ft, or less. For the purposes of this disclosure, a "landing field length" is the length of a runway on which an aircraft is to land. For the purposes of this disclosure, a "required landing field length," is the length of the shortest runway on which an aircraft is configured to land. For the purposes of this disclosure, a "takeoff field length" is the length of a runway on which an aircraft is to takeoff. For the purposes of this disclosure a "required takeoff field length" is the length of the shortest runway on which an aircraft is configured to be able to safely takeoff from. Landing gear system is described in FIG. 4A-4B. Additional disclosure on landing gear systems may further be found in U.S. patent application Ser. No. 15/198,611, filed on Jun. 30, 2016, and titled "TILTING LANDING GEAR SYSTEMS AND METHODS," the entirety of which is incorporated by reference. Additional disclosure on landing gear systems may further be found in U.S. patent application Ser. No. 17/870,365, filed on Jul. 21, 2022, and titled "NON-COUPLED LANDING GEAR APPARATUS AND METHODS OF USE," the entirety of which is incorporated by reference.

Figure 2A:
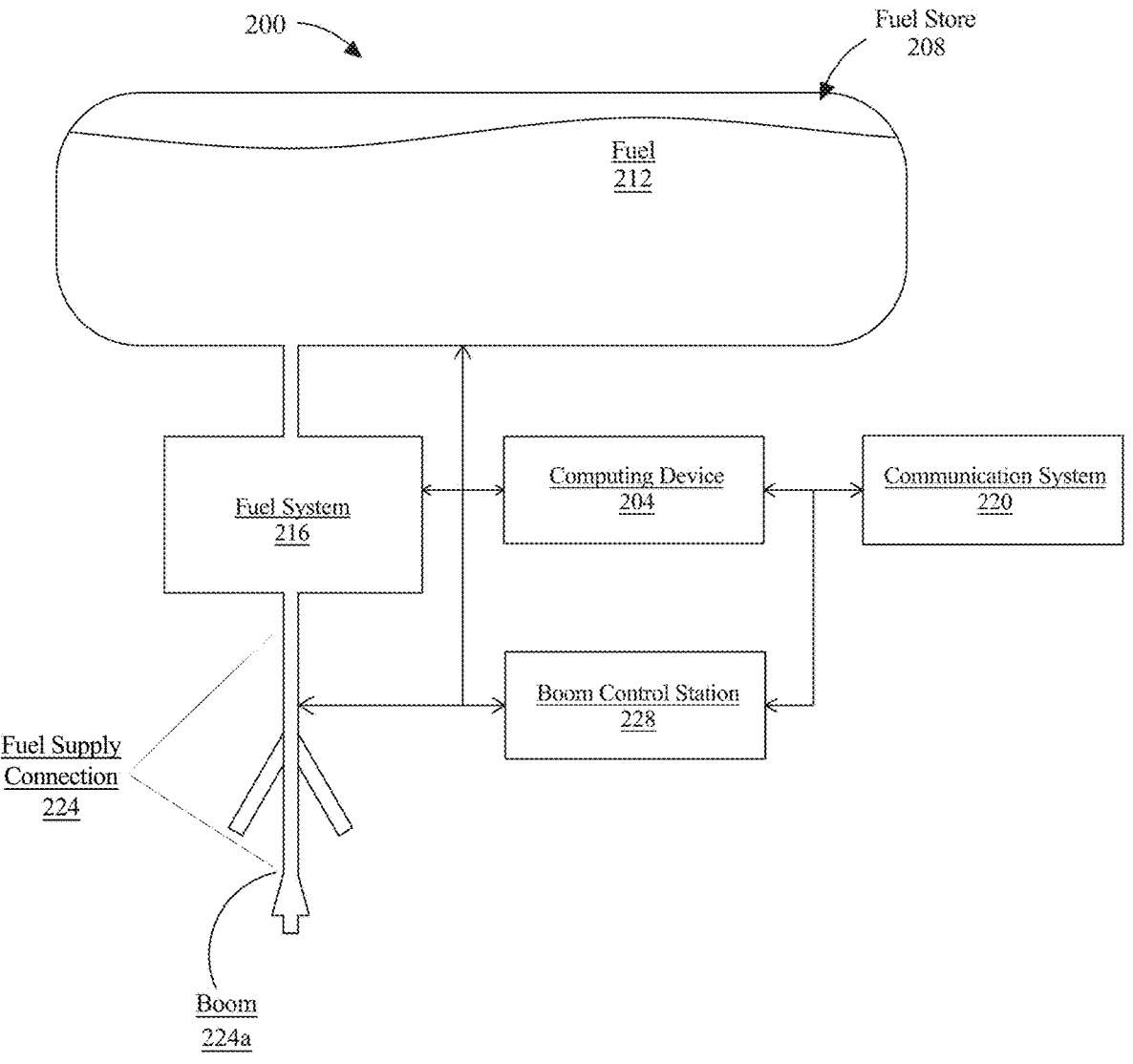
FIG. 2A is a block diagram showing an exemplary embodiment of a fuel offloading system including a boom.
Figure 2B:
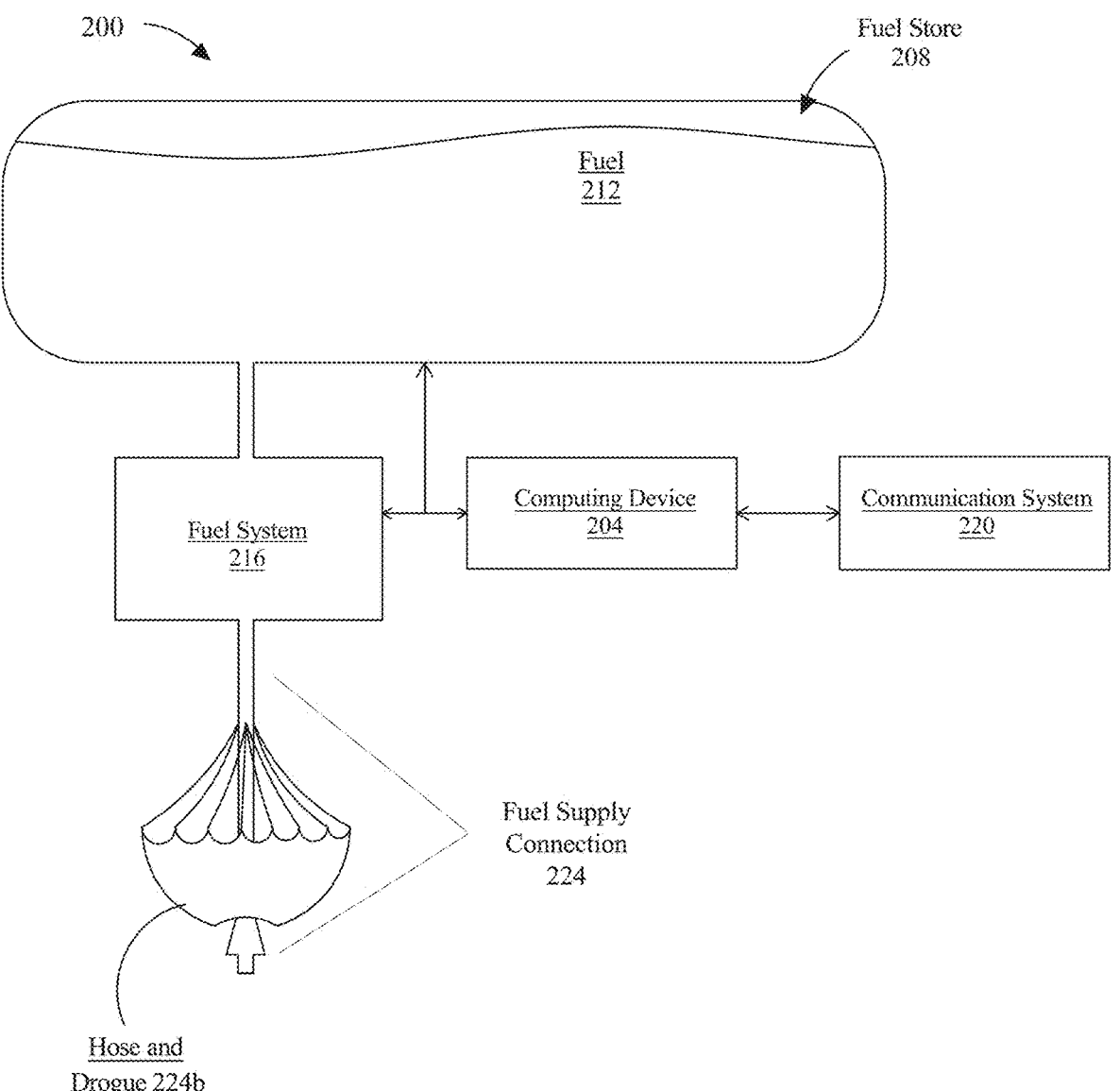
FIG. 2B is a block diagram showing an exemplary embodiment of a fuel offloading system including a hose a drogue.

With continued reference to FIG. 1, In some cases, in a first position nose gear may be retracted wherein nose gear is retracted from inside the outer mold line of tanker aircraft. Additionally or alternatively, in a second position nose gear may be Referring now to FIGS. 2A-2B, exemplary refueling boom systems 200 are illustrated by way of block diagrams. FIG. 2A illustrates an exemplary fuel offloading system 200 with a boom. FIG. 2B illustrates an exemplary fuel offloading system 200 with a hose and drogue. System 200 may include a computing device 204. Computing device 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 204 may include a single computing device operating independently, or may include two or more computing device operating in concert, in parallel, sequentially or the like; two or more computing devices may be included together in a single computing device or in two or more computing devices. Computing device 204 may interface or communicate with one or more additional devices as described below in further detail via a network interface device. Network interface device may be utilized for connecting computing device 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 204 may include but is not limited to, for example, a computing device or cluster of computing devices in a first location and a second computing device or cluster of computing devices in a second location. Computing device 204 may include one or more computing devices dedicated to data storage, security, distribution of traffic for load balancing, and the like. Computing device 204 may distribute one or more computing tasks as described below across a plurality of computing devices of computing device, which may operate in parallel, in series, redundantly, or in any other manner used for distribution of tasks or memory between computing devices. Computing device 204 may be implemented using a "shared nothing" architecture in which data is cached at the worker, in an embodiment, this may enable scalability of system 200 and/or computing device.

With continued reference to FIGS. 2A-2B, computing device 204 may be designed and/or configured to perform any method, method step, or sequence of method steps in any embodiment described in this disclosure, in any order and with any degree of repetition. For instance, computing device 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIGS. 2A-2B, fuel offloading system 200 may include a fuel store 208 configured to store a fuel 212. Fuel store 208 may include any fuel store described in this disclosure, including without limitation a tank, a bladder, a reservoir, or the like. Fuels store may further include first fuel store and/or second fuel store as described in this disclosure. In some embodiments, fuel store 208 may removably attached to tanker aircraft 100, for example within blended wing body. In some cases, fuel store 208 may be removably installed (along with fuel offloading system 200) in order to allow aircraft to operate as a tanker and removed for the aircraft to serve other purposes. In some cases, installation of fuel store 208 may be achieved by way of one or more cargo doors through which the fuel store 208 may enter blended wing body. Cargo door may include any door described in this disclosure. In some cases, aircraft 100 may operate as a personnel or cargo transport, for instance with fuel offloading system 200 and/or fuel store 208 removed and or made inoperable. In some cases, fuel store 212 may include one or more fuel sensors, such as without limitation level sensors and/or temperature sensors. Fuel sensors may be in communication with computing device 204.

With continued reference to FIGS. 2A-2B, fuel offloading system 200 may include a fuel system 216. As used in this disclosure, a "fuel system" is any system that is configured to provide for the conveyance of fuel. Fuel system 216 may include flow control devices, such as without limitation valves, regulators, and the like. As used in this disclosure, a "valve" is a component that controls fluidic communication between two or more components. Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of a fluidic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device 204. Computing device 204 may be in communication with valve, for example by way of one or more of electrical communication, hydraulic communication, pneumatic communication, mechanical communication, and the like. In some cases, computing device 204 may be in communication with one or more components (e.g., valve, pump, sensors, and the like) by way of one or more networks, including for example wireless networks and controller area networks (CANs). Fuel system 216 may include pressurization or flow inducing devices, such as without limitation pumps. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed. In some cases, pump may be communicative with computing device 204. Computing device 204 may control pump, for instance by way of a control signal. In some cases, fuel system 216 may include one or more fuel sensors. As used in this disclosure, a "fuel sensor" is a device that detects a fuel variable based upon a phenomenon associated with the fuel. Exemplary non-limiting fuel sensors include flow sensors, pressure sensors, level sensors, temperature sensors, and the like. Sensors may communicate with computing device 204 using one or more signals representative of fuel variable. Sensors and/or pumps may be in communication with computing device 204 by way of electrical communication, optical communication, mechanical communication, fluidic communication or the like. In some cases, components may be communicative with computing device 204 by way of at least a network, for example a local area network, a controller area network, or the like. In some cases, computing device 204 may be communicative by way of one or more communication protocols, such as without limitation ethernet, serial, and parallel communication protocols. As used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like. Computing device 204 may be in communication with an input device, wherein the input device may communicate with computer system about the location of fuel supply connection 524a-b. Computing device 204 may be in communication with input device in anyway as described in this disclosure. Input device may include a sensor such as, and without limitation, a proximity sensor, ultrasonic sensor an optical proximity sensor and the like. Input device may further include a video capture device. Video capture device may capture a surrounding area of tanker aircraft. Video capture device may further capture a surrounding area of fuel supply connection 224 wherein video capture device may transmit videos to an operator such that an operator can visually determine the location of fuel supply connection 224.

With continued reference to FIGS. 2A-2B, fuel offloading system 200 may include a communication system 220. Communication system 220 may be configured to communicate with a device (communication system e.g.,) on receiving aircraft (i.e. aircraft being refueled by aircraft 100). Communication system 220 may communicate by way of radio communication, optical communication, cellular communication, satellite communication, or the like. In some cases, communication system 220 may include a network interface card; the communication system 220 may communicate by way of one or more networks. In some cases, information communicated by way of communication system 220 may be automatically generated, for example by computing device 204, flight controller, or the like. Alternatively or additionally, in some cases, information communicated by way of communication system 220 to receiving aircraft may be at least partially human generated, for instance by a crewmember of aircraft 100. In some cases, communication system 220 may communicate by way of one or more signals.

With continued reference to FIGS. 2A-2B, fuel offloading system 200 may include a fuel supply connection 224. As used in this disclosure, a "fuel supply connection" is a fluidic conduit connecting fuel offloading system 200 and a receiving aircraft. As used in this disclosure, a "receiving aircraft" is an aircraft that has, is going to, or is currently being refueled by aircraft 100 and is thus receiving. Aircraft 100 may have one or more fuel supply connections 224 and therefore be able to fuel one or more receiving aircraft at a time. In some cases, tanker may have a fuel supply connection 224 generally at center of aircraft. Alternatively or additionally, in some cases, aircraft 100 may have a fuel supply connection 224 laterally aligned with a point along one or both wings (or transitions) and therefore off-center. In some cases, a fuel supply connection 224 may have a valve located at a distal end. Valve (e.g., poppet valve) may be configured to open automatically when fuel supply connection has mated with receiving vehicle. In some cases, toggles may connect fuel supply connection with receiving aircraft. In some cases, fuel supply connection 224 may mate with a (female) receptacle in receiving aircraft. Alternatively or additionally, fuel supply connection 224 may mate with a (male) probe in receiving aircraft.

Referring to FIG. 2A, fuel supply connection 224 includes a boom 224a. As used in this disclosure a "boom" is a rigid fuel supply connection. Boom 224a may be configured to extend and insert into a receptacle on receiving aircraft. In some cases, boom 224a may include a flying boom. As used in this disclosure, a "flying boom" is a rigid, telescoping tube with movable flight control surfaces. In some cases, boom 224a may be operated by from a boom control station 228. In some cases, a boom operator may be located within boom control station 228 on tanker aircraft 100. Alternatively or additionally, boom control station 228 may be remotely located or include a computing device configured to automatically control boom 224a. In some cases, boom 224a may include flight control surfaces (e.g., small movable airfoils that are often in a V-tail configuration) configured to move the boom by aerodynamic forces. In some cases, flight control surfaces may be actuated using an actuator and controlled from boom control station 228, for example by boom operator using a control stick. In some cases, boom 224a may telescope, effectively lengthening the boom 224a. Boom 224a may telescope through actuation of one or more actuators controlled from control station 228, for example by boom operator.

With continued reference to FIGS. 2A-2B, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIGS. 2A-2B, in some embodiments, actuator may include a hydraulic actuator. A hydraulic actuator may consist of a cylinder or fluid motor that uses hydraulic power to facilitate mechanical operation.

Output of hydraulic actuator may include mechanical motion, such as without limitation linear, rotary, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIGS. 2A-2B, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 2A-2B, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least three different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

With continued reference to FIGS. 2A-2B, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Referring now to FIG. 2B, fuel supply connection 224 may include a hose and drogue 224b. As used in this disclosure, a "hose and drogue" is a flexible hose that trails from tanker aircraft 100. Drogue 224b (i.e. para-drogue or basket) includes a fitting resembling a shuttlecock, attached with a valve to flexible hose. Drogue 224b may stabilize hose in flight. In some cases, drogue 224b may provide a funnel to aid insertion of receiver aircraft probe into the hose. In some cases, hose 224b connects to a Hose Drum Unit (HDU). When not in use, hose/drogue 224b may be reeled completely into HDU. In some cases, receiver aircraft has a probe, which is a rigid, protruding, pivotable, or retractable arm proximal the receiving aircraft's nose or fuselage to make fluidic connection with hose. In some embodiments, probe may be retractable and retracted when not in use.

Additional disclosure is provided below to further describe the disclosure and some exemplary embodiments. In some embodiments, aircraft may be powered by liquid hydrogen (LH2) and deliver kerosene-based fuel to receiving aircraft. In some cases, an LH2-powered BWB tanker can deliver more fuel to a greater radius than a kerosene-powered BWB tanker. As described above, LH2 is relatively lighter and thus permits BWB to carry greater kerosene-based fuel weight without sacrificing range. Alternatively or additionally, in some cases, with a small sacrifice in kerosene-based fuel weight (and an equally small LH2 weight increase), tanker can offload fuel over longer ranges. In some embodiments, additional volume required by LH2 is accommodated by a comparatively large internal volume of BWB configuration. In some embodiments, BWB tanker may operate using LH2 fuel, providing energy for all of its own needs, such as without limitation propulsion systems, avionics, controls, environmental control systems, lighting, tanker systems, and the like.

In some embodiments, BWB aircraft may be configured to carry a relatively large quantity and weight of kerosene-based fuel. In some cases, this fuel may be accessible in flight by tanker systems including, without limitation, fuel lines, pumps, boom(s) and hose-and-drogue(s), tanker systems to permit offloading of fuel, boom operator station, and the like.

In some embodiments, BWB aircraft may be configured to transport cargo. For instance, BWB may be configured with cargo systems. Exemplary cargo systems may include without limitation one or more cargo compartments, cargo restraining means (e.g., cargo floor with rollers, rails, locks and the like), a forward cargo barrier (configured to protect pilots and crew), cargo doors and openings (configured to permit cargo to be loaded, distributed within the airplane, and unloaded), and the like.

In some embodiments, BWB aircraft may include a hybrid tanker. As used in this disclosure, a "hybrid tanker" is a tanker that may be powered by more than one energy (e.g., fuel) source. For instance, in an exemplary embodiment, an LH2 powered tanker may also be able to operate on kerosene-based fuel; as a result, the tanker could provide kerosene at even greater ranges, although that range would come at a cost of offload capability. In some cases, propulsion systems comprise at least an engine capable of operating using at least two different types of fuel (e.g., LH2 and kerosene-based fuel or LNG and kerosene-based fuel). In some cases, a hybrid tanker may have an added advantage of extremely great ferry ranges. As used in this disclosure, "ferrying" an airplane refers to flying an airplane to a destination without payload, for instance for the purpose of operational relocation or repositioning.

In yet another exemplary embodiment, aircraft may be powered using liquid natural gas (LNG) and may carry a kerosene-based fuel payload (e.g., Jet-A). Like LH2, LNG is less dense than kerosene-based fuels, but has a higher mass energy density (energy per unit weight). Although differences between LNG and kerosene-based fuel are not as great as differences between LH2 and kerosene-based fuel.

In still another exemplary embodiment, aircraft may be propelled by hydrogen and/or kerosene, while delivering only kerosene. In some cases, an engine configured to propel aircraft 100 may operate on hydrogen and/or kerosene. In some cases, engine may be hot-swapped between fuels, for example while in flight and operating. In some cases, enabling aircraft 100 to fly on kerosene can provide a benefit by extending its service radius, for instance at an expense of reduced fuel delivered. In some cases, enabling tanker 10 to fly on kerosene may enable the tanker to operate from bases that cannot provide hydrogen fuel. In some cases, enabling aircraft 100 to fly with by consuming multiple fuel types (e.g., hydrogen and kerosene) allows multiple fuel types to be used for reserve fuel. Airplanes generally carry substantial reserve fuel sufficient to fly a certain distance or to sustain flight for a certain period. If aircraft 100 can fly on two types of fuel, it may use either type for reserves. Hydrogen fuel is much lighter than kerosene so reserves in hydrogen may impose a reduced weight penalty to aircraft 100, thereby improving performance. In some cases, aircraft 100 fuel reserves may include hydrogen and/or natural gas.

In another exemplary embodiment, aircraft may be configured to deliver one or more hydrogen and/or natural gas to another aircraft in-flight. In some cases, performance of certain types of airplanes may benefit from use of hydrogen fuel. For example, some long endurance reconnaissance or signal relay airplanes may benefit from hydrogen's light weight or its ability to be converted efficiently to electricity with a fuel cell. Such long endurance airplanes may benefit from in-flight refueling. Accordingly, in some cases, aircraft may be propelled by a first fuel, including kerosene and configured to deliver a second fuel, including one or more of hydrogen and natural gas.

In still another exemplary embodiment, aircraft may include one or more additional external fuel storage tanks. In some cases, external storage tanks may be mounted to an underside of a blended wing body aircraft, for instance under main body or wings. Alternatively or additionally, in some cases, external storage tanks may be mounted to a topside of a blended wing body aircraft, for instance on top of main body or wings. Alternatively or additionally, an external tank may be mounted aft of a blended wing body aircraft, for instance aft of main body or wings. In some cases, external tanks may optionally include a means of offload, for example a hose-and-drogue system. In some cases, external tanks may be aerodynamically shaped, for instance into a shape of a canoe or torpedo. In some cases, an external fuel tank may increase fuel storage by 1,000 to 100,000 kilograms, for instance about 10,000 kilograms, about 20,000 kilograms, or about 30,000 kilograms. External fuel tanks may be configured to store any fuel described in this disclosure, for example kerosene-based fuels, hydrogen, and/or natural gas.

In still another embodiment, oxygen content of ullage within one or more fuel tanks is controlled (e.g., minimized). As used in this disclosure, "ullage" is empty volume within a tank (i.e., store or storage). In some cases, oxygen content may be reduced by addition of one or more inert gases, for example nitrogen. In some cases, one or more inert gases may be provided by a dedicated system. In some cases, one or more fuel tanks (i.e., stores) configured to carry a kerosene-based fuel or a gasoline-based fuel may be mounted to a dedicated system to control Oxygen content in ullage by filling the ullage with inert gas; this act may be referred to within this disclosure as "fuel tank inerting".

In one or more embodiments, aircraft may include both cargo (or passenger) storage and fuel storage described in this disclosure. For instance, and without limitation, an aircraft tanker may include fuel storage in tanks of each wing of aircraft such that wing tanks are located outboard of a pressurized payload cabin of fuselage. Thus, pressurized cabin, which may include a main cabin and/or outboard bays used to store smaller containers (e.g., LD-3 containers), may still be used to store payload, such as cargo or people. In another instance, and without limitation, an outboard cargo volume, which may be used to hold smaller LD-3 containers, may be used for fuel storage to provide additional fuel volume if needed. In a nonlimiting exemplary embodiment, the combined left and right outboard storage may in a combined volume of 300,000 lb. of fuel. This allows for sufficient storage of fuel in wing tanks and allowing for cargo storage in the main cabin of the fuselage. Thus, the interior region of the airplane within the pressurized volume can be used for fuel storage, cargo storage, and/or passenger seating. For example, and without limitation, main cabin(s) of aircraft may be used for carrying cargo, people (e.g., troops or commercial passengers), electronic systems and operators, or medical facilities (e.g., hospital airplane).

Figure 3:
FIG. 3 is a schematic of an exemplary blended wing aircraft.

Referring to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from aircraft. In some cases, this combination may offer several advantages over tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to tube-wing aircraft) fuselage, providing a large usable volume. In some embodiments, passengers seated within an interior of aircraft, real-time video at every seat can take place of window seats.

With continued reference to FIG. 3, BWB 304 of aircraft 300 may include a nose portion. A "nose portion," for the purposes of this disclosure, refers to any portion of aircraft 300 forward of the aircraft's fuselage 316. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e., above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contain an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 312 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of acceler-ometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Inde-pendent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabiliz-ers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exerts differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include with-out limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for air-craft 300. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be deter-mined above which no net benefit exists from further increased span. There may also be operational consider-ations that limit the allowable wingspan (e.g., available width at airport gates).

Wingtip devices, in some cases, may increase lift gener-ated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improve-ment in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a win-glet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often based upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component 308, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 312 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 3, aircraft 300 may include a flight component 308 that includes at least a nacelle 308. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases, an aircraft cockpit may also be housed in a nacelle, rather than in a fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium.

Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term Jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used, and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figures 4A, 4B:
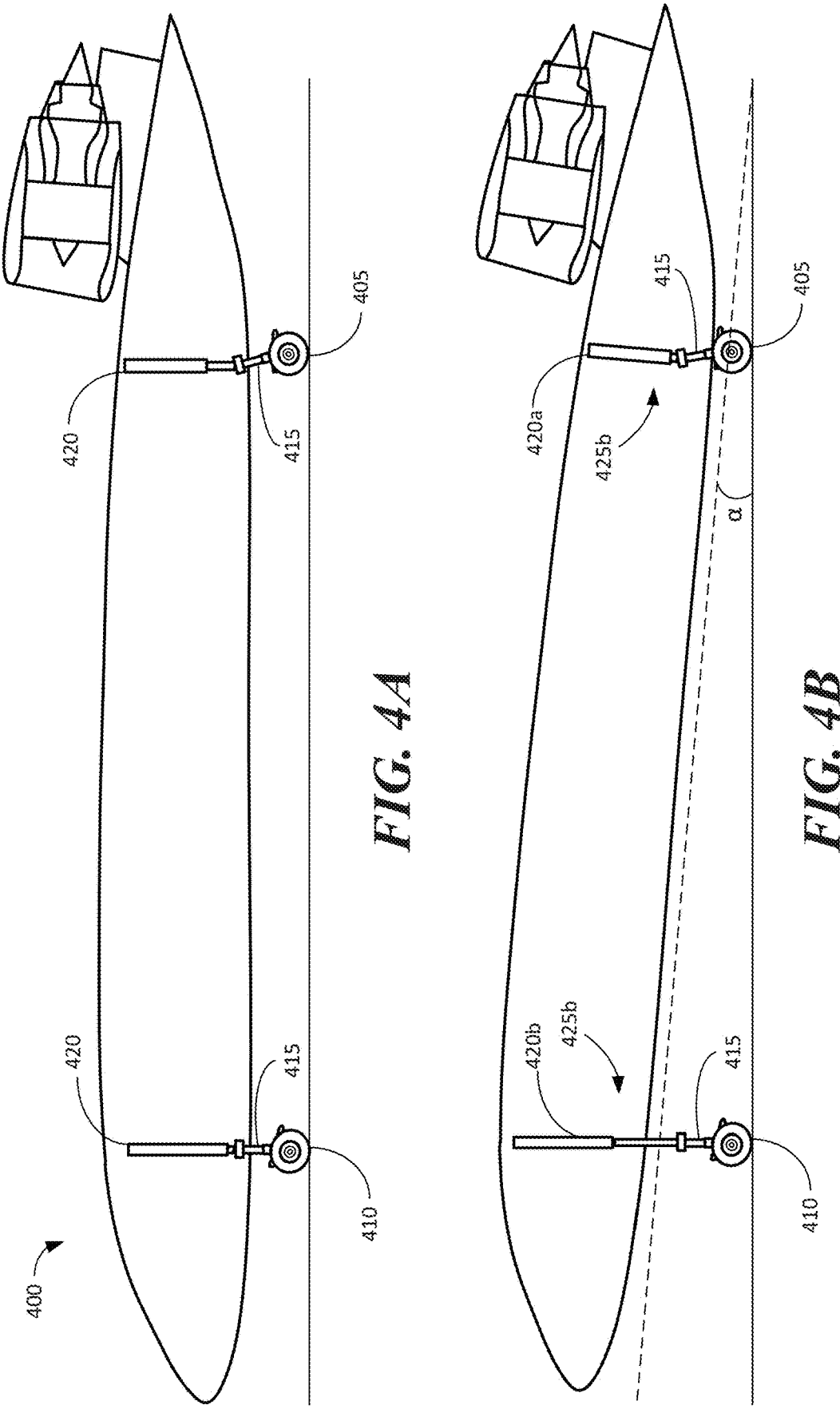
FIG. 4A-4B are side views depicting a blended-wing aircraft with a direct hydraulic tilting landing gear system in the level, or ground position and in an angle of attack (AOA) position, in accordance with some examples of the present disclosure.

Referring now to FIG. 4A-4B, a side view of a blended wing aircraft with a landing gear system is illustrated. Landing gear system 400 may include a main gear 405 that can squat and/or a nose gear 410 that can extend to mechanically provide the desired angle-of-attack (AOA or a) for takeoff and/or landing. In some examples, landing gear system 400 can comprise two or more main gears 405a and one or more nose gear 410. In some cases, landing gear system 400 may include standard oleo struts 415 (e.g., airfoil pneumatic struts) mounted on one or more actuators 420. In some embodiments, the actuators 420 can be cylinders that are hydraulically or pneumatically linked, such that when one hydraulic cylinder 420 collapses the other hydraulic cylinder 420 extends, and vice versa. In some embodiments, the hydraulic cylinder 420 can be independently controlled to work in concert. In a preferred embodiment, the hydraulic cylinder 420 can comprise hydraulic cylinders that are also hydraulically linked.

As shown in FIG. 4A, therefore, in the level, or ground, configuration, the aircraft can be substantially level. In this configuration, the hydraulic cylinders 420 can be positioned such that the oleo struts 415 suspend the aircraft at a substantially level attitude with respect to the ground. This can enable passengers and cargo to be loaded onto the aircraft in the conventional manner. This can also enable the aircraft to be taxied for takeoff without unnecessarily affecting the pilot's view of the ground or adversely affecting ground handling. In other examples, the aircraft can have a slightly nose heavy configuration, for example, when the aircraft is on the ground, the nose hydraulic cylinder 420b is fully retracted and the main hydraulic cylinder 420a is fully extended. As discussed below, in some examples, for safety purposes, the hydraulic cylinders 420 can be locked in the level position anytime the aircraft is on the ground and below a predetermined speed unless otherwise overridden—e.g., for maintenance purposes.

As shown in FIG. 4B, however, to enable the aircraft to rotate for takeoff or landing, the main hydraulic cylinder 420a can collapse and the nose hydraulic cylinder 420b can extend to provide the desired AOA. In this configuration, as with conventional landing gear, the oleo struts 415 react to impacts and undulations on the ground, but these motions are measured in inches, quite small relative to the stroke needed for the tilting system. As the hydraulic cylinders collapse and extend, however, the overall height of the strut/cylinder assembly 425 changes. Thus, as the main hydraulic cylinder(s) 420a (i.e., two or more main hydraulic cylinder 420a for the two or more main gears 405a) retracts, the rear strut/cylinder assembly 425a squats. Conversely, as the nose hydraulic cylinder 420b (i.e., the cylinder for the nose gear 410) extends, the nose strut/cylinder assembly 425b extends. This has the effect of lowering the rear of the aircraft and raising the front of the aircraft to simulate takeoff rotation and/or landing flare.

Notably, however, this attitude is achieved with the landing gear 405, 410 still on the ground. In addition, as discussed below, the location and size of the hydraulic cylinders 420 can be such that they are essentially in equilibrium about the CG. In this manner, the system 400 can rotate the aircraft with very little force provided by the aerodynamic surfaces of the wing. This (1) overcomes the aforementioned issues related to overcoming a large LMG and (2) does so with the wing in a more aerodynamically efficient configuration. Because rotation requires much less negative lift and thus, deflection of the elevons 110 (or elevons in a tailless configuration) and/or flaps 115, the wing is also in a "cleaner" aerodynamic configuration (at least initially). In other words, significantly less negative lift is required at the back of the wing to generate the rotation moment, enabling the wing to provide greater positive lift for takeoff. This, in turn, can reduce takeoff speed, and therefore takeoff distance.

Upon takeoff, once the main gear 405 has cleared the tarmac, the location of the main gear 405 is no longer relevant from an aerodynamic standpoint. Once aloft, the location of the main gear 405 is relevant only from a weights and balances standpoint, which can be accounted for with fuel, cargo, and/or passenger weight, among other things. At or before liftoff, therefore, the flight control surfaces 120 can be positioned to provide the necessary aerodynamic forces to maintain the desired AOA for climb out.

Of course, while shown and described with hydraulic cylinders 420, pneumatic cylinders and other types of linear or rotary actuators could be used. Landing gear system 400 could utilize linear actuators, for example, electrically driven by the aircraft's electrical system. Landing gear system 400 could also utilize servo motors, for example, with a rack and pinion or pushrod actuation to the landing gear 405, 410. Indeed, rather than using separate hydraulic cylinders 420, as shown, landing gear system 400 could use lengthened versions of the existing oleo struts 415 interconnected in a similar manner. This configuration might reduce weight and complexity if sufficient space is available in the airplane for the lengthy struts 415 and the volume swept by the rotation angle needed for retraction. Thus, any type of mechanism that can enable the main gear 405 to squat and/or the nose gear 410 to lift can provide the necessary AOA.

Figure 5:
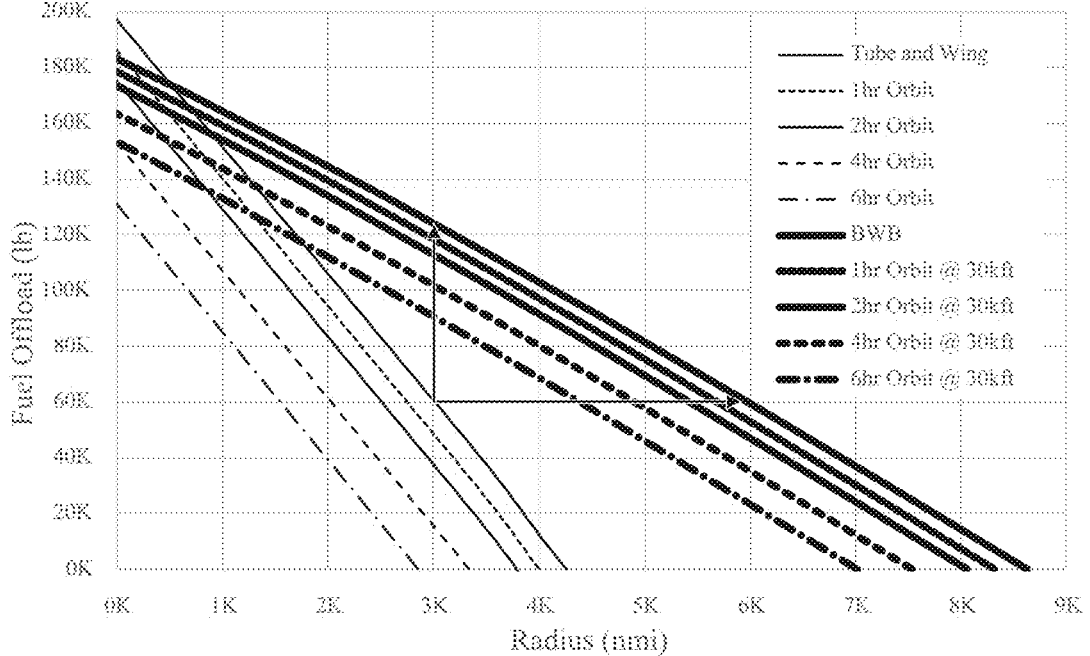
FIG. 5 is a graph that illustrates offload capacity as a function of a range for an exemplary tube and wing tanker and an exemplary blended wing body aircraft, according to some embodiments.

Referring now to FIG. 5, a graph is shown that displays fuel offload capacity and radius for an exemplary tube and wing aircraft (e.g., KC-46A) and an exemplary blended wing body (BWB) aircraft. The graph shows radius in nautical miles along a horizontal axis. The graph shows fuel offload capacity in pounds along a vertical axis. Different curves on the graph show offload capacity to range for different orbits, including 1 hr, 2 hr, 4 hr, and 6 hr. The chart assumes half-tank hookups of 9,000 lbs, one hour on station with reserves. Notably, where tube-and-wing aircraft has a maximum offload of 60,000 lbs and a maximum range of about 3,000 nmi, BWB aircraft can have either twice offload capacity, 120,000 lbs, at common radius, 3,000 nmi, or twice radius, 6,000 nmi, with a common offload capacity, 60,000 lbs. In some cases, BWB aircraft may have an offload capacity of between 80,000 lbs and 160,000 lbs as a common radius of 3,000 nmi.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
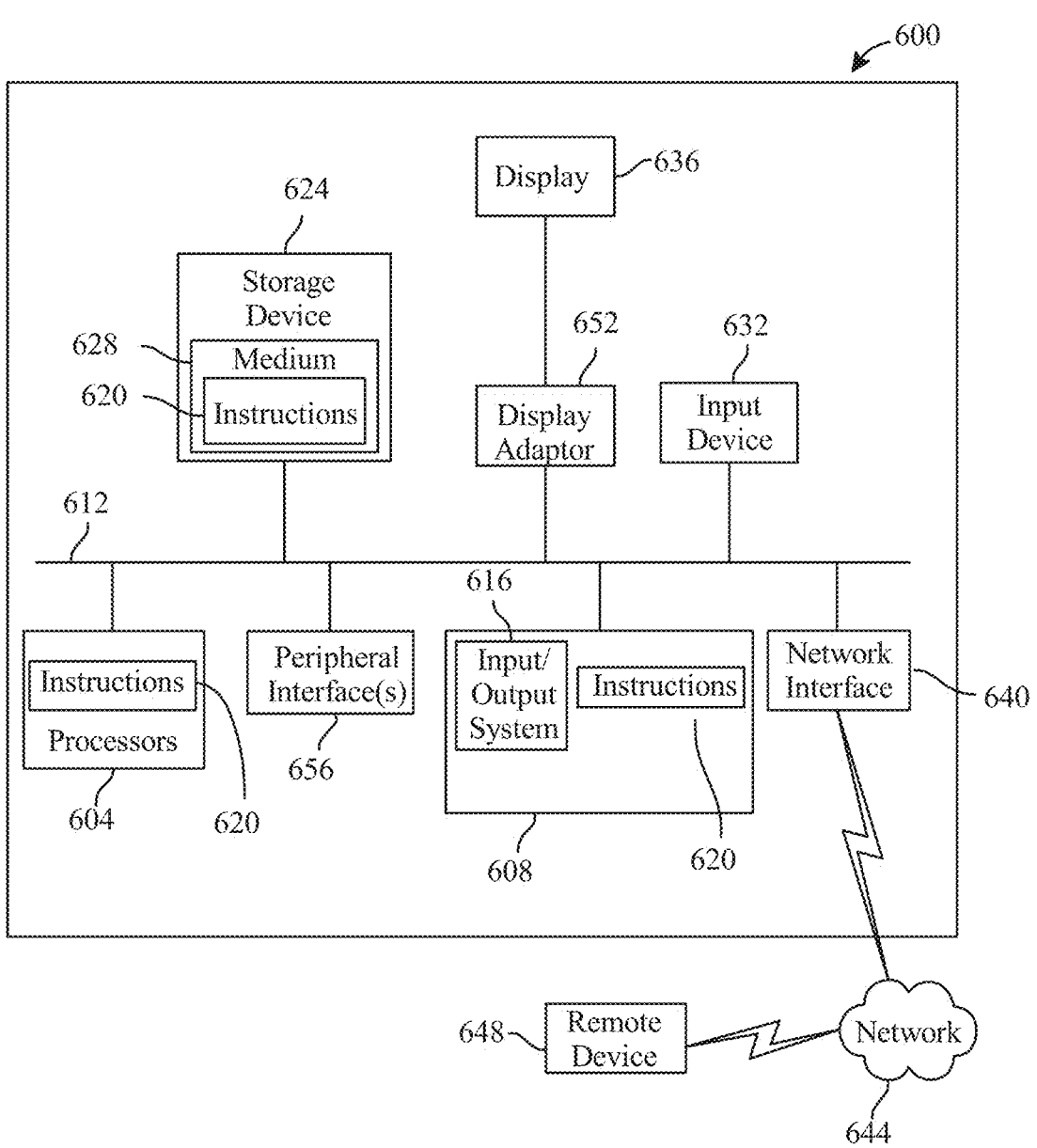
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A tanker aircraft for long-distance travel, the tanker aircraft comprising:
   a blended wing body having a main body, a transition, and wings with no demarcation between the wings and the main body along a leading edge of the tanker aircraft;
   a cargo store;
   a fuel storage comprising a first fuel store and a second fuel store;
   an interior cavity within the main body having a single deck, wherein at least a portion of the cargo store and the second fuel storage are located on or above the single deck;
      wherein the fuel storage is located within the blended wing body,
      wherein the first fuel store is located within the transition and is configured to extend flight range; and
      wherein the second fuel store comprises a tanker capacity;
   a refueling boom system having a flying boom, wherein the flying boom is configured to extend from the blended wing body, wherein the flying boom further comprises at least a flight control surface with a V-tail configuration; and
   a fuel offloading system;
   wherein the tanker aircraft is a long-range tanker aircraft.

2. The tanker aircraft of claim 1, wherein the second fuel store is located within the main body.

3. The tanker aircraft of claim 1, wherein the fuel offloading system is fluidly connected to the first fuel store and the second fuel store.

4. The tanker aircraft of claim 2, wherein the tanker aircraft further comprises at least a propulsor attached to the main body, wherein the at least a propulsor is configured to receive fuel from the first fuel store and the second fuel store.

5. The tanker aircraft of claim 1, wherein the tanker aircraft is configured to support a fuel offload between 80,000 and 160,000 lb at a radius of 3,000 nmi.

6. The tanker aircraft of claim 1, wherein the fuel off-loading system is removably attached to the blended wing body.

7. The tanker aircraft of claim 1, wherein the fuel off-loading system further comprises a fuel sensor, the fuel sensor configured to detect a fuel quantity.

8. The tanker aircraft of claim 1, wherein the tanker aircraft is configured to support a maximum flight distance of at least 9000 nautical miles.

9. The tanker aircraft of claim 1, wherein a fully loaded tanker is configured for a takeoff field length between 7,000 and 10,000 ft.

10. The tanker aircraft of claim 1, wherein a portion of an aircraft skin of the blended wing body comprises a carbon fiber material.

11. The tanker aircraft of claim 10, wherein the carbon fiber material comprises a stitched carbon fiber cloth.

12. The tanker aircraft of claim 1, wherein the tanker aircraft further comprises at least a propulsor, wherein the at least a propulsor is attached to an upper aft surface of main body.

13. The tanker aircraft of claim 1, wherein the refueling boom system is configured for aerial refueling.

14. The tanker aircraft of claim 1, wherein the tanker aircraft is further configured to provide a maximum flight radius of at least 5,700 nautical miles with a maximum fuel capacity of at least 50,000 lbs.

15. The tanker aircraft of claim 1, wherein:

the tanker aircraft further comprises a landing gear system, the landing gear system comprising:

a nose gear disposed proximate a front of the tanker aircraft, the nose gear controllably movable between a first position in which the nose gear is retracted, and a second position in which the nose gear is extended; and a main gear disposed proximate a rear of the tanker aircraft, the main gear controllably movable between a third position, in which the main gear is extended, and a fourth position, in which the main gear is retracted;

in a ground position, the nose gear is in the first position and main gear is in the third position and a fuselage of the tanker aircraft is substantially level with a ground surface; and in an angle-of-attack (AOA) position, the nose gear is in the second position and the main gear is in the fourth position and the fuselage of the tanker aircraft is rotated to a positive AOA with respect to the ground surface.

16. The tanker aircraft of claim 1, wherein the tanker aircraft is configured to support a maximum takeoff gross weight between 200,000 and 400,000 lbs.

\* \* \* \* \*